Aug. 31, 1965       F. Y. CRONK, JR       3,203,714
               QUICK OPENING COUPLING
Filed July 26, 1963                      2 Sheets-Sheet 1

INVENTOR.
Fred Y. Cronk, Jr.
BY
Mildred K. Flowers
AGENT

Aug. 31, 1965    F. Y. CRONK, JR    3,203,714
QUICK OPENING COUPLING
Filed July 26, 1963    2 Sheets-Sheet 2
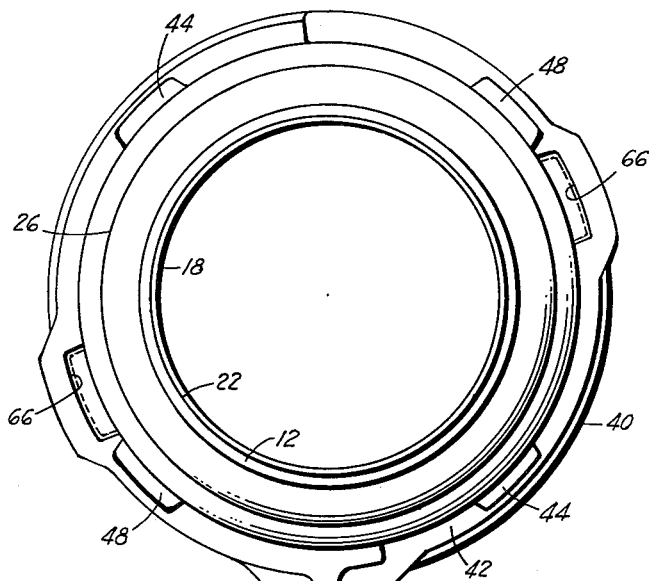
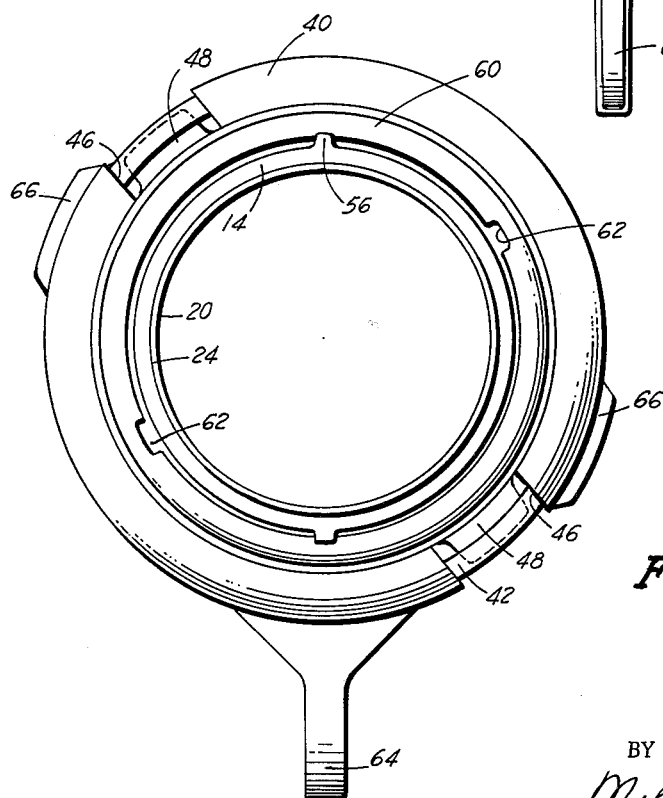
INVENTOR.
Fred Y. Cronk, Jr.
BY
Mildred K. Flowers
AGENT

United States Patent Office 3,203,714
Patented Aug. 31, 1965

3,203,714
QUICK OPENING COUPLING
Fred Y. Cronk, Jr., Tulsa, Okla., assignor to
J. Frank Winters, Wichita, Kans.
Filed July 26, 1963, Ser. No. 297,887
3 Claims. (Cl. 285—81)

This invention relates to improvements in coupling devices and more particularly, but not by way of limitation, to a quick opening and closing coupling device for tubular members.

There are many instances wherein it is desirable to quickly connect or disconnect tubular members, such as pipes, hoses, and the like, in end to end relation. There are many couplings available today to solve this problem. Many of these couplings utilize wedging members such as cam lever arms movable in one direction to tightly wedge the coupled parts together in the connected position, and movable in an opposite direction to release the locking engagement and permit a ready disconnection of the coupled members. Most of the presently available couplings of the lever arm type include at least two oppositely disposed independently operable lever members in order to attain the efficient wedging action required in the closed or connected position between the tubular members. Other types of quick couplings utilize pin members, or other locking devices for retaining the elements of the coupling in the connected position, and the disadvantages of the use of pin members, and the like will be apparent. Still other quick opening couplings utilize cooperating ball and detent arrangements to provide the quick opening and closing action. The ball and detent devices are usually of a more costly and complicated construction, which is a disadvantage. In addition, there is usually no wedging action in the engaged position of the ball and detent type couplings, and as a result, the sealing action is normally not as great as is possible with the wedging action in quick operating couplings.

The present invention contemplates a novel quick coupling which is provided with a ring type cam incorporating two wedging engagement surfaces operable simultaneously with a single handle for quick opening or closing of the coupling device. The handle may be rotated through an arc of approximately forty-five degrees to securely wedge or lock the coupling and rotated through approximately forty-five degrees in a reverse direction for permitting ready disconnection thereof. In addition, the internal bore of the novel coupling is substantially straight and provides a greater cross-sectional area for maximum flow through the coupled joint. Furthermore, the novel coupling is particularly designed and constructed to permit a swiveling action of at least one of the tubular members with respect to the other through aproximately a 180 degrees rotation without uncoupling of the device. The novel quick opening coupling utilizes the efficient wedging action to provide sufficient pressure on the sealing gasket to assure an efficient seal between the mating elements thereof. The novel coupling is simple and efficient in operation and economical and durable in construction.

It is an important object of this invention to provide a novel quick opening coupling device wherein a wedging action is utilized to provide an efficient sealing of the coupling in the coupled position thereof.

It is another object of this invention to provide a novel quick opening coupling device having at least two co-operating wedging engagement surfaces operable simultaneously through the action of a single handle member.

Still another object of this invention is to provide a novel quick opening coupling device operable by a ring-cam device whereby rotation of the ring-cam in one direction readily wedges the coupling in an engaged position and rotation of the ring-cam in an opposite direction quickly releases the engagement to permit ready opening of the coupling.

Another object of this invention is to provide a novel quick opening coupling device having a swivel connection whereby one of the tubular members may be orientated with respect to the other without uncoupling of the tubular members.

A further object of this invention is to provide a novel quick opening coupling device which is simple and efficient in operation and economical and durable in construction.

Other and further objects and advantageous features of the present invention will hereinafter more fully appear in connection with the detailed description of the drawings in which:

FIGURE 2 is an elevational view taken on line 2—2 of FIGURE 1.

FIGURE 3 is an elevational view taken on line 3—3 of FIGURE 1.

Figure 1:
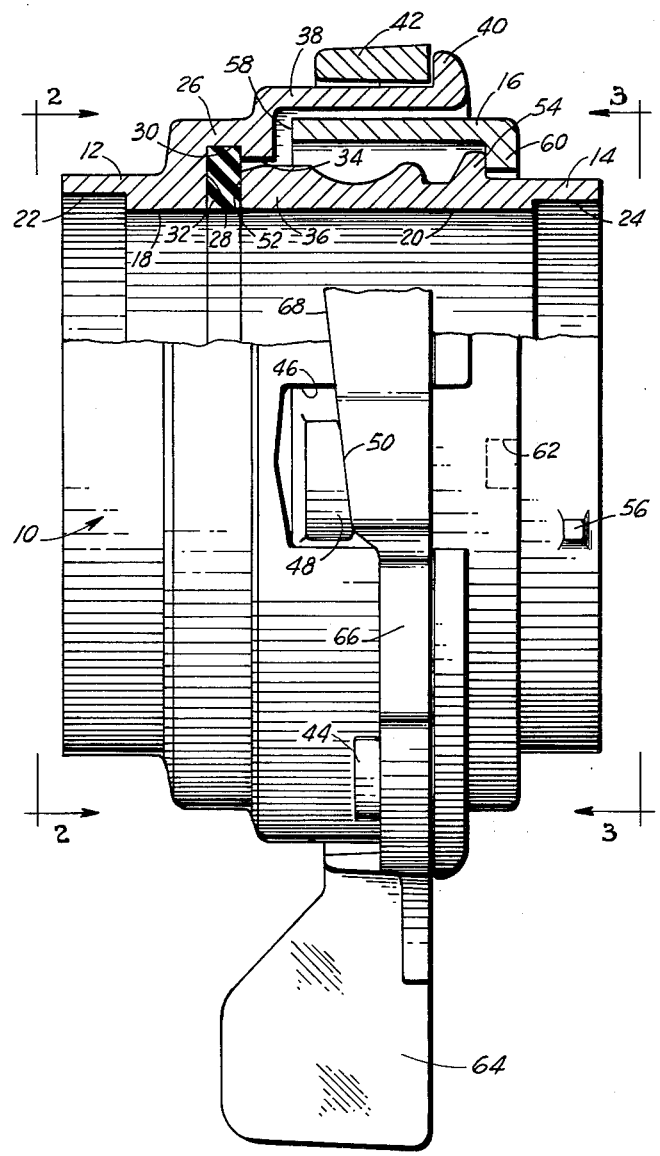
FIGURE 1 is a side elevational view, partly in section, of a coupling device embodying the invention.

Referring to the drawings in detail, reference character 10 generally indicates a coupling device comprising an outer housing member 12 of substantially cylindrical configuration for receiving an inner sleeve member 14 therein. An intermediate sleeve 16 is interposed therebetween for retaining the housing 12 and sleeve 14 in the coupled or engaged position, as will be hereinafter set forth. The inner bore 18 of the housing 12 is preferably of substantially the same diameter as the inner bore 20 of the sleeve 14 to provide a substantially smooth internal bore for the coupling 10 in the engaged or coupled position thereof, thus providing a relatively large cross-sectional area for maximum flow of fluid through the coupling 10.

The bore 18 may be enlarged at 22 for receiving a tubular member therein (not shown) whereby the housing 12 may be connected with the tubular member in any well known manner (not shown). The bore 20 may be similarly enlarged at 24 for receiving a second tubular member (not shown) whereby the sleeve 14 may be connected with the second tubular member in any well known manner (not shown). The housing 12 as shown herein is known as a "bell with weld socket" and the sleeve 14 is known as a "jack with weld socket," but it is to be noted that there is no intention to limit the invention to this type of connection with the tubular members. The housing 12 and sleeve 14 may be of threaded female and/or male connection types for being threadedly secured to the tubular members, if desired. In addition, it is anticipated that the two members 12 and 14 may be of a construction whereby one thereof is a threaded connection type for being secured to a tubular member and the other thereof is closed at one end to provide a cover for the coupling 10 in lieu of connection with a second tubular member.

The outer housing 12 is enlarged at 26 (FIGURE 1) and an annular shoulder 28 is provided on the inner periphery thereof conterminous with a circumferential groove 30 for receiving an annular sealing gasket 32 therein. The inner bore 34 of the enlarged portion 26 extends from the groove 30 in an opposite direction from the shoulder 28 and is preferably of a slightly larger diameter than the outer diameter of the end portion 36 of the sleeve 14 to provide clearance for facilitating the disposition of the sleeve 14 within the housing 12. The housing 12 is further enlarged at 38 to provide clearance for the intermediate ring or sleeve 16 in the engaged or connected position of the coupling 10, as clearly shown in FIGURE 1. An outwardly extending circumferential flange 40 is provided on the open end of the enlarged portion 38 for receiving a ring-cam 42 thereagainst, and at least two diametrically opposed radially outwardly extending lugs 44 are provided on the outer periphery of the enlarged portion 38 and spaced from the flange 40 for retaining the ring-cam 42 securely in position adjacent the flange 40, as will be hereinafter set forth in detail.

A pair of oppositely disposed recesses 46 are provided in the enlarged portion 38 of the outer housing 12, each receiving a lug 48 therein in the coupled position of the coupling 10. The lugs 48 extend radially outward from the outer periphery of the intermediate ring or sleeve 16 and are circumferentially spaced therearound in accordance with the spacing of the recesses 46 in the housing 12. The lugs 48 are preferably of a smaller longitudinal dimension than the transverse dimension of the complementary recesses 46 to provide clearance for facilitating the insertion of the lugs 48 into the respective recesses 46 upon disposition of the sleeve 16 within the housing 12. Whereas, two of the recesses 46 and lugs 48 are depicted herein, substantially any desired number of recesses and corresponding lugs may be provided. At least one surface 50 (FIGURE 1) of each lug 48 is cammed or angularly disposed for cooperation with the ring-cam 42 to provide a wedging action for the coupling 10 in the engaged or connected position thereof, as will be hereinafter set forth.

One end 52 of the inner sleeve 14 abuts against the gasket or sealing member 32 in the engaged position of the coupling 10 for efficiently precluding leakage of fluid between the sleeve 14 and housing 12. An outwardly extending circumferential flange 54 is provided on the outer periphery of the sleeve 14 and spaced from the end 52 for a purpose as will be hereinafter set forth. A plurality of circumferentially spaced radially outwardly extending lugs 56 are provided on the outer periphery of the sleeve 14 and spaced from the flange 54 in the direction opposite from the end 52. Two of the lugs 56 are depicted herein, but substantially any desired number of the lugs 56 may be provided.

The ring 16 is provided with one open end 58 preferably of an inner diameter slightly greater than the outer diameter of the flange 54 whereby the ring 16 may be readily disposed over the inner sleeve 14, as shown in FIGURE 1. The opposite end of the ring 16 is provided with an inwardly directed circumferential flange 60 for engagement with the flange or shoulder 54 to limit the movement of the ring 16 in one direction with respect to the sleeve 14. In addition, a plurality of circumferentially spaced recesses or grooves 62 are provided in the flange 60 and are of a size sufficiently larger than the lugs 56 to permit the lugs 56 to pass readily therethrough as the ring 16 is disposed over the sleeve 14. It will be readily apparent that a slight rotation or twisting of either the ring 16 with respect to the sleeve 14, or the sleeve 14 with respect to the ring 16 will move the recesses 62 out of register with the lugs 56, thus precluding removal of the ring 16 from the sleeve 14.

It is to be noted that there is sufficient clearance between the sleeve 14 and ring 16 to permit free rotation of the inner sleeve 14 with respect to the ring 16. Thus, a swivel action is provided for the coupling 10 in order to permit rotational orientation between the inner sleeve 14 and the outer housing 12, as will be hereinafter set forth in detail.

The ring-cam 42 is loosely disposed around the outer periphery of the outer housing 12 whereby the ring-cam may be freely rotated with respect thereto. A radially extending handle member 64 is provided on the outer periphery of the ring-cam 42 for facilitating the manual rotation of the ring-cam during operation of the coupling 10. In addition, a plurality of spaced radially outwardly extending grooves or recesses 66 are provided in the ring-cam 42. The recesses 66 are sufficiently larger than the lugs 44 on the outer periphery of the outer housing 12 to facilitate disposition of the ring-cam 42 over the outer periphery of the housing 12 and to a position adjacent the flange 40 when the recesses 66 are properly aligned or orientated with respect to the lugs 44. The lugs 44 will be as shown in dotted lines in FIGURE 2 when the ring-cam 42 is to be disposed on the housing 12. Of course, a slight turning or rotation of the ring-cam 42 with respect to the housing 12 will move the recesses out of register with the lugs 44, and the lugs 44 will then cooperate with the ring-cam 42 to preclude removal thereof from the outer periphery of the housing 12.

It is to be noted that the lugs 44 are not in longitudinal or axial alignment with the recesses 46 of the housing 12. Thus, when the recesses or grooves 66 of the ring-cam 42 are moved into alignment or register with the recesses 46 of the housing 12, the ring-cam will be held securely in position on the housing 12 and the lugs 48 may be readily inserted into the recesses 46 for facilitating disposition of the intermediate sleeve 16 within the housing 12. Of course, the inner swivel sleeve 14 is engaged by the intermediate sleeve 16, and disposition of the intermediate sleeve 16 within the housing 12 positions the swivel sleeve 14 therein also. When the sleeve 14 is inserted within the housing 12 a sufficient distance, the end 52 thereof is brought into abutting engagement with the sealing gasket 32.

As hereinbefore set forth, at least one surface of each of the lugs 48 is canted or cammed to provide a wedging surface. A plurality of circumferentially spaced angularly disposed or cam wedging portions 68 (FIGURE 1) are provided along at least one side edge of the ring-cam 42 for cooperating with the cam surfaces 50 of the lugs 48 to provide a wedging action for the coupling 10 in the engaged position thereof. As the ring-cam is rotated in one direction with respect to the outer housing 12 and intermediate sleeve 16, the cam surfaces 68 of the ring-cam 42 are moved into engagement with the complementary cam surfaces 50 of the lugs 48, and a continued rotation of the ring-cam in the same direction will urge the lugs 48 in a direction toward the sealing member 32, thus moving the intermediate ring 16 and swivel sleeve 14 in a direction toward the sealing gasket 32. This wedging action provides a tight sealing engagement between the sealing gasket 32 and the end 52 of the sleeve 14 for efficiently precluding leakage of fluid from the engaged coupling 10.

It will be readily apparent that rotation of the ring-cam 42 in one direction causes a simultaneous engagement between each of the wedge members 68 and respective wedge members 50 whereby a single rotation of the ring-cam will quickly and efficiently wedge the sleeve 14 and ring 16 within the housing 12. Conversely, rotation of the ring-cam 42 in an opposite direction will decrease the wedging pressure, and a continued rotation in the said opposite direction will release the connection between the complementary wedging surfaces and permit withdrawal of the intermediate sleeve 16 and swivel sleeve 14 from the outer housing 12.

Operation

The outer housing 12 may be secured to one end of a tubular member (not shown) in any well known manner, and the swivel sleeve 14, with the ring 16 loosely disposed thereon, may be similarly secured to one end of a second tubular member (not shown). As hereinbefore set forth, the ring 16 may be disposed around the outer periphery of the sleeve 14 by arranging the recesses 62 in alignment with the lugs 56, and may be retained in position thereon by rotating the ring 16 slightly with respect to the sleeve 14 for moving the recesses 62 out of alignment with the lugs 56.

When it is desired to couple the two tubular members together, the handle 64 of the ring-cam 42 may be manually grasped for rotating the ring-cam in one direction to move the recesses 66 into alignment with the recesses 46 of the outer housing 12. In this position, the lugs 48 of the intermediate ring 16 may be quickly and easily inserted into the recesses 46 for disposition of the swivel sleeve 14 within the outer housing 12. The ring-cam may then be rotated in an opposite direction whereby the cam or wedging surfaces 68 will be brought into engagement with the cam surfaces 50 of the lugs 48. A continued rotation of the ring-cam will urge the lugs 48 in a direction toward the sealing member 32 whereby the end 52 of the sleeve 14 will be urged into a tight sealing engagement therewith. It will be apparent that each of the wedge surfaces 68 will move simultaneously into engagement with the wedge surfaces 50 of the respective lugs 48, thus providing an efficient wedging action for the coupling upon rotation of the single ring-cam member. In addition, a hammer, or the like (not shown) may be utilized to strike a blow on the handle 64, if desired, to increase the wedging action between the mating or complementary wedging surfaces, and increase the sealing engagement between the sealing gasket and the sleeve 14.

When it is desired to rotate or swivel the sleeve 14 with respect to the outer housing 12 and ring 16 for any reason, the wedging engagement between the surfaces 68 and 50 may be slightly released whereby the swivel sleeve 14 may be freely rotated. As long as the lugs 48 are not in alignment with the recesses 66, the ring 16 and sleeve 14 cannot become disengaged from the housing 12, nor can the swivel sleeve 14 become disengaged from the ring 16. The engagement between the flanges 54 and 60 preclude separation of the swivel sleeve 14 and ring 16 when the ring 16 is engaged by the ring-cam 42. Thus, the swivel sleeve 14 may be rotated throughout substantially any desired angle of rotation without a disconnection of the coupling 10.

When it is desired to disconnect the two tubular members, the ring-cam 42 may be rotated in a direction for moving the recesses 66 into alignment with the lugs 48. The ring 16 and sleeve 14 may then be readily withdrawn from the outer housing 12 to disconnect the tubular members. The ring 16 will remain in position on the sleeve 14 as long as the recesses 62 are not in alignment with the lugs 56.

From the foregoing, it will be apparent that the present invention provides a novel quick opening coupling particularly designed and constructed for utilizing a wedging action to provide an efficient sealing of the coupling in the engaged position thereof. A plurality of camming or wedging surfaces may be simultaneously engaged through the action of a single rotatable ring-cam member for quickly and efficiently wedging the coupling members together in the engaged position. In addition, a reverse rotation of the ring-cam slightly releases the wedging engagement to permit free swiveling or rotation of the swivel sleeve for facilitating orientation of one tubular member with respect to the other. A continued reverse rotation of the ring-cam releases the locking engagement of the coupling members whereby the coupling may be quickly and easily opened for a disengagement between the tubular members. The novel quick acting coupling is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. A quick acting coupling comprising a first element adapted for engagement with a second element, ring-cam means loosely disposed on the outer periphery of said first element, lug and flange means provided on the outer periphery of the first element for retaining the ring-cam means thereon, lug means provided on the outer periphery of said second element and extending radially outward through the first element for cooperating with said ring-cam means for wedging said second element within said first element upon rotation of the ring-cam means in one direction, and swivel means loosely disposed within said second element and independently secured thereto, said swivel means being rotatable with respect to said first and second elements to permit rotational orientation with respect to the first element without a longitudinal disengagement therebetween.

2. A quick acting coupling comprising an outer housing, ring-cam means rotatably disposed on the outer periphery of said housing, means for retaining said ring-cam in position on said housing, a plurality of spaced recesses provided in said housing, a ring member adapted for insertion within said housing to provide an engaged position for the coupling, a swivel member loosely disposed within the ring member and freely rotatable therein, a plurality of spaced lug members provided on the outer periphery of said ring member and adapted for insertion within said recesses of said housing in one position of the ring-cam means thereon, said lug members each having a cam surface engageable by a complementary cam surface provided on said ring-cam means upon rotation thereof in one direction with respect to the housing for retaining the ring and swivel members within the housing, sealing means interposed between the outer housing and the swivel means, and said complementary cam surfaces providing a wedging sealing engagement of said swivel means with said sealing gasket upon continued rotation of said ring-cam means in one direction.

3. A quick acting coupling comprising an outer housing, ring-cam means rotatably disposed on the outer periphery of the housing, means integral with the housing for retaining the ring-cam means in position thereon, sealing means carried by the housing, a plurality of spaced recesses provided in the housing, a ring member adapted for disposition within the housing to provide an engaged position for the coupling, a swivel member loosely disposed within the ring member for independent rotation with respect thereto, lug and recess means cooperating between the ring member and swivel member in one relative position therebetween to permit separation thereof and another relative position therebetween to retain the swivel member within the ring member, a plurality of lug members provided on the outer periphery of the ring member for engagement with the recesses of the housing in the engaged position of the coupling, a plurality of wedging surfaces provided on the ring-cam member, each of said lug members provided with a wedging surface complementary to the wedging surfaces of the ring-cam member and engageable thereby upon rotation of the ring-cam member in one direction for precluding removal of the lugs from the recesses, said swivel member freely rotatable with respect to the ring member and housing in at least one engaged position of the coupling, said ring-cam further rotatably movable with respect to the housing in said one direction whereby the complementary wedging surfaces are increasingly engaged for wedging the swivel body within the housing and into sealing engagement with the seal member, said ring-cam member rotatable in an opposite direction with respect to the housing for slightly decreasing the wedging engagement between the complementary wedging surfaces to permit the said rotation of the said swivel member, said ring-cam further rotatable in said opposite direction to permit removal of said lug members from said recesses for releasing the engaged position of the coupling.

References Cited by the Examiner

UNITED STATES PATENTS 1,997,858　4/35　Clawson _____ 285—362

FOREIGN PATENTS 1,026,065　1/53　France.
　　6,560　5/95　Great Britain.

CARL W. TOMLIN, Primary Examiner.